United States Patent
Wang et al.

(10) Patent No.: US 11,351,682 B2
(45) Date of Patent: Jun. 7, 2022

(54) ENVIRONMENT MONITORING AND ASSOCIATED MONITORING DEVICE

(71) Applicant: International Business Machines Corporation, Armonk, NY (US)

(72) Inventors: Qia Wang, Beijing (CN); Quan Yuan, Beijing (CN); Guang Qing Zhong, Beijing (CN); Kun Yan Yin, Ningbo (CN)

(73) Assignee: International Business Machines Corporation, Armonk, NY (US)

( * ) Notice: Subject to any disclaimer, the term of this patent is extended or adjusted under 35 U.S.C. 154(b) by 412 days.

(21) Appl. No.: 16/445,262

(22) Filed: Jun. 19, 2019

(65) Prior Publication Data
US 2020/0398446 A1    Dec. 24, 2020

(51) Int. Cl.
| | |
|---|---|
| *B25J 19/02* | (2006.01) |
| *B25J 9/16* | (2006.01) |
| *B25J 9/00* | (2006.01) |
| *B25J 5/00* | (2006.01) |

(52) U.S. Cl.
CPC ........... *B25J 19/023* (2013.01); *B25J 5/007* (2013.01); *B25J 9/0003* (2013.01); *B25J 9/1661* (2013.01); *B25J 9/1664* (2013.01); *B25J 9/1674* (2013.01); *B25J 9/1697* (2013.01)

(58) Field of Classification Search
USPC ................................................ 700/245–264
See application file for complete search history.

(56) References Cited

U.S. PATENT DOCUMENTS

| | | | | |
|---|---|---|---|---|
| 9,263,877 B1* | 2/2016 | Kellogg | ................ | G01K 7/22 |
| 9,709,965 B2* | 7/2017 | Slessman | ............. | G06F 1/3203 |
| 9,843,847 B2* | 12/2017 | Lewis | .................. | H04Q 9/00 |
| 10,335,962 B1* | 7/2019 | Rosenberg | ......... | B25J 9/1674 |

(Continued)

FOREIGN PATENT DOCUMENTS

| | | |
|---|---|---|
| CN | 205121281 U | 3/2016 |
| CN | 106681887 A | 5/2017 |

(Continued)

OTHER PUBLICATIONS

Benchoff, Brian, "Roomba Becomes Data Center Robot", Hackaday, Feb. 13, 2013, 1 page.

(Continued)

*Primary Examiner* — Jonathan L Sample
(74) *Attorney, Agent, or Firm* — Joseph P. Curcuru

(57) ABSTRACT

Embodiments of the present disclosure relate to environment monitoring and associated monitoring device, in which region-level environmental conditions are obtained and are detected by a plurality of sensors installed in a plurality of regions of a space enclosing electronic devices. Additionally, respective region priorities of the plurality of regions are determined based at least in part on the region-level environmental conditions, a region priority indicating a probability of occurrence of a risk event within a corresponding region. Furthermore, a movement path of a moveable monitoring device through the plurality of regions is determined based on the region priorities for detecting device-level environmental conditions associated with the electronic devices, and a moveable monitoring device and a system are disclosed.

20 Claims, 6 Drawing Sheets

(56) References Cited

U.S. PATENT DOCUMENTS

| | | | | |
|---|---|---|---|---|
| 2007/0287430 | A1* | 12/2007 | Hosain | H04M 11/002 |
| | | | | 455/414.1 |
| 2010/0271199 | A1* | 10/2010 | Belov | G01M 5/00 |
| | | | | 340/539.3 |
| 2014/0361888 | A1* | 12/2014 | Huang | G08B 25/009 |
| | | | | 340/539.1 |
| 2015/0375398 | A1* | 12/2015 | Penn | B25J 5/005 |
| | | | | 700/218 |
| 2016/0107312 | A1* | 4/2016 | Morrill | B25J 9/0093 |
| | | | | 700/214 |
| 2017/0293906 | A1* | 10/2017 | Komarov | H04L 63/102 |
| 2019/0236732 | A1* | 8/2019 | Speasl | H04L 9/3247 |
| 2019/0339687 | A1* | 11/2019 | Cella | G06N 3/006 |
| 2019/0358428 | A1* | 11/2019 | Wang | B25J 11/008 |
| 2020/0050206 | A1* | 2/2020 | Deyle | G01S 13/881 |
| 2020/0053324 | A1* | 2/2020 | Deyle | H04N 7/185 |
| 2020/0090022 | A1* | 3/2020 | Ma | G06N 3/008 |
| 2020/0234609 | A1* | 7/2020 | Murphy | G05D 1/0016 |

FOREIGN PATENT DOCUMENTS

| | | |
|---|---|---|
| CN | 107256189 A | 10/2017 |
| CN | 108390765 A | 8/2018 |
| CN | 108714886 A | 10/2018 |
| CN | 106078745 B | 1/2019 |
| CN | 112115014 A | 12/2020 |
| EP | 1959532 A1 | 8/2008 |

OTHER PUBLICATIONS

Mell et al., "The NIST Definition of Cloud Computing", NIST, National Institute of Standards and Technology, U.S. Department of Commerce, Special Publication 800-145, Sep. 2011, 7 pages.

* cited by examiner

ENVIRONMENT MONITORING AND ASSOCIATED MONITORING DEVICE

BACKGROUND

The present invention relates to environment monitoring, and more specifically, to environment monitoring and associated monitoring device.

It is often efficient to store or arrange electronic devices in groups (such as in racks or cabinets) in a single location and disposed at different heights. Proper operation of the electronic devices generally depends on environmental conditions at the storage location, including the ambient environment surrounding the devices as well as the operational status. For example, extreme ambient humidity and temperature levels and variations in ambient parameters place deleterious effects on electronic devices due to different moisture absorptions and thermal dissipations. These deleterious effects can impact overall reliability, availability, life expectancy, maintenance frequency and support costs for electronic devices. In addition, detailed knowledge of current operational status for electronic devices is also important in maintaining the functionality, ability, and integrity of the devices to meet a particular requirement.

SUMMARY

Embodiments of the present invention disclose a method and a system comprising: obtaining, by one or more processors, region-level environmental conditions detected by a plurality of sensors installed in a plurality of regions of a space enclosing electronic devices; determining, by the one or more processors, respective region priorities of the plurality of regions based at least in part on the region-level environmental conditions, a region priority indicating a probability of occurrence of a risk event within a corresponding region; and determining, by the one or more processors, based on the region priorities, a movement path of a moveable monitoring device through the plurality of regions for detecting device-level environmental conditions associated with the electronic devices.

Additionally, embodiments of the present invention disclose a moveable monitoring device, comprising: a main body; a driving assembly coupled to the main body for drive movement of the moveable monitoring device; at least one sensor coupled to the main body; and a controller configured to: obtain a movement path of the moveable monitoring device through a plurality of regions in a space enclosing electronic devices, the movement path being based on region-level environmental conditions detected by a plurality of sensors installed in the plurality of regions, instruct the driving assembly to drive the moveable monitoring device to move along the movement path, and instruct the at least one sensor to detect device-level environmental conditions associated with the electronic devices.

DETAILED DESCRIPTION

Figure 1:
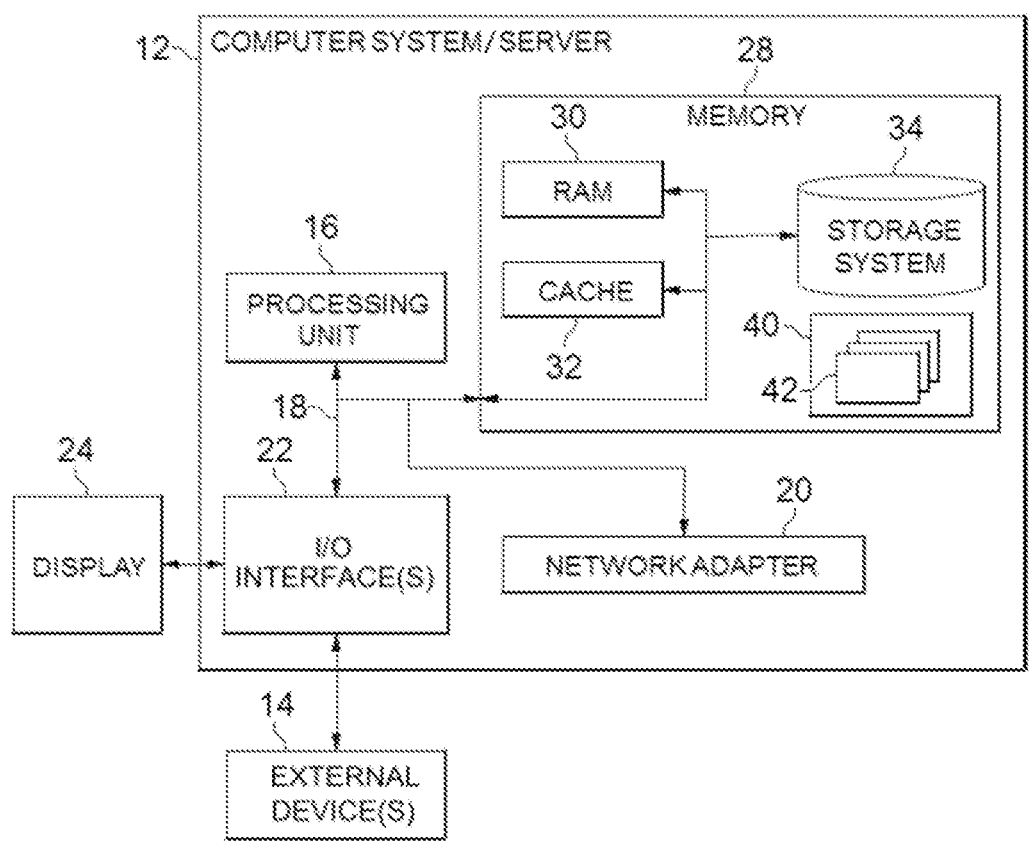
FIG. 1 is a functional block diagram illustrating a cloud computing node, in accordance with an embodiment of the present invention.

Generally, in order to collect information about the environmental conditions, a person can periodically visit each device rack and record the desired information, such as the temperature, the operational status, and/or any other desired information known in the art. This manual process is labor intensive, error prone, time consuming, costly to implement, and requires specialized equipment. In addition, it is difficult to monitor the environmental conditions in real time and collect the accurate information for devices at different heights.

Furthermore, automatic monitoring solutions have been proposed in attempts to solve current issues in the art. An automatic monitoring system includes a number of sensors deployed for environment monitoring. To obtain accurate information on the environmental conditions associated with the electronic devices, different sensors can be installed in connection with the respective electronic devices. Thus, due to massive devices and a massive number of devices, a large number of sensors are needed to be fixed to the corresponding electronic devices, resulting in higher cost. Multiple sensors can be installed proximately to each of the electronic devices if different types of environmental conditions are to be monitored, which can further increase the cost.

Additionally, a proposed moveable robot to replace the role of the person to automatically collect the environmental conditions using sensors arranged thereon has been considered. However, such robots generally move along a predetermined path and thus the flexibility is limited. The designs of some robots cannot be capable of monitoring electronic devices located at different heights.

According to embodiments of the present invention, a proposed an improved solution for automatic environment monitoring is disclosed. This solution comprises two levels of environment monitoring. A set of sensors are installed in different regions of a space enclosing electronic devices to detect region-level environmental conditions. The region-level environmental conditions are used to determine respective priorities of those regions. A movement path through the regions is dynamically determined based on the respective priorities such that a moveable monitoring device can move along this path to detect device-level environmental conditions associated with the electronic devices. In this way, accurate device-level environment monitoring can be achieved with lower cost and high efficiency.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a computer system/server is shown. Computer system/server 12 can be described in the general context of computer system-executable instructions, such as program modules, being executed by a computer system. Generally, program modules can include routines, programs, objects, components, logic, data structures, and so on that perform particular tasks or implement particular abstract data types. Computer system/server 12 can be practiced in distributed cloud computing environments where tasks are performed by remote processing devices that are linked through a communications network. In a distributed cloud computing environment, program modules can be located in both local and remote computer system storage media including memory storage devices.

As shown in FIG. 1, a functional block diagram illustrating components of a computer system/server in a cloud computing node, in accordance with an embodiment of the present invention. In the depicted embodiments, computer system/server 12 in cloud computing node 10 is shown in the form of a general-purpose computing device. The components of computer system/server 12 can include, but are not limited to, one or more processing units 16, a system memory 28, and a bus 18 that couples various system components including system memory 28 to one or more processing units 16. It should be noted that one or more processing units 16 can be one or more processors.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 can include at least one program product having a set (e.g., at least one) of program modules that are configured to carry out the functions of embodiments of the invention.

Program/utility 40, having a set (at least one) of program modules 42, can be stored in memory 28 by way of example, and not limitation, as well as an operating system, one or more application programs, other program modules, and program data. Each of the operating system, one or more application programs, other program modules, and program data or some combination thereof, can include an implementation of a networking environment. Program modules 42 generally carry out the functions and/or methodologies of embodiments of the invention as described herein.

Computer system/server 12 can also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
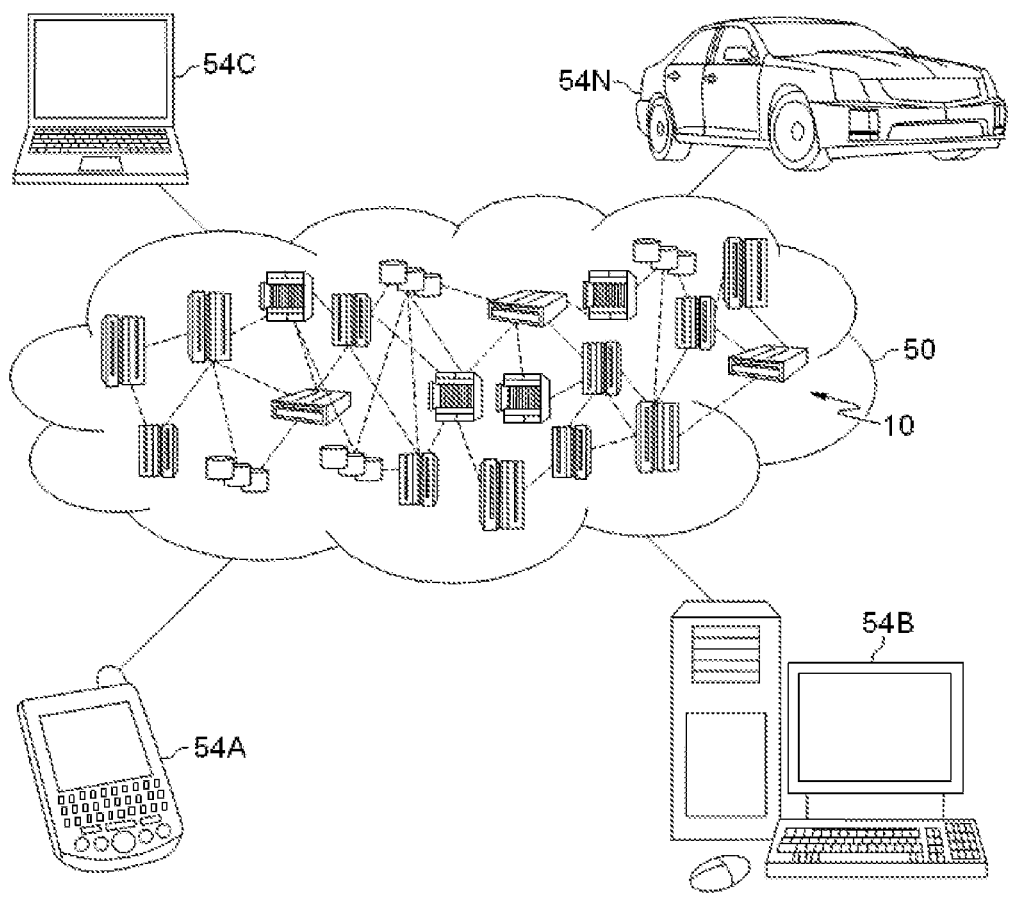
FIG. 2 is a functional block diagram illustrating a cloud computing environment, in accordance with an embodiment of the present invention.

Referring now to FIG. 2, FIG. 2 is a functional block diagram illustrating cloud computing environment 50, in accordance with an embodiment of the present invention. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Cloud computing nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

In various embodiments, cloud computing nodes 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing nodes 10 there can be computer system/server 12 or a portable electronic device such as a communication device, which is operational with numerous other general purposes or special purpose computing system environments or configurations. Examples of well-known computing systems, environments, and/or configurations that can be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 3:
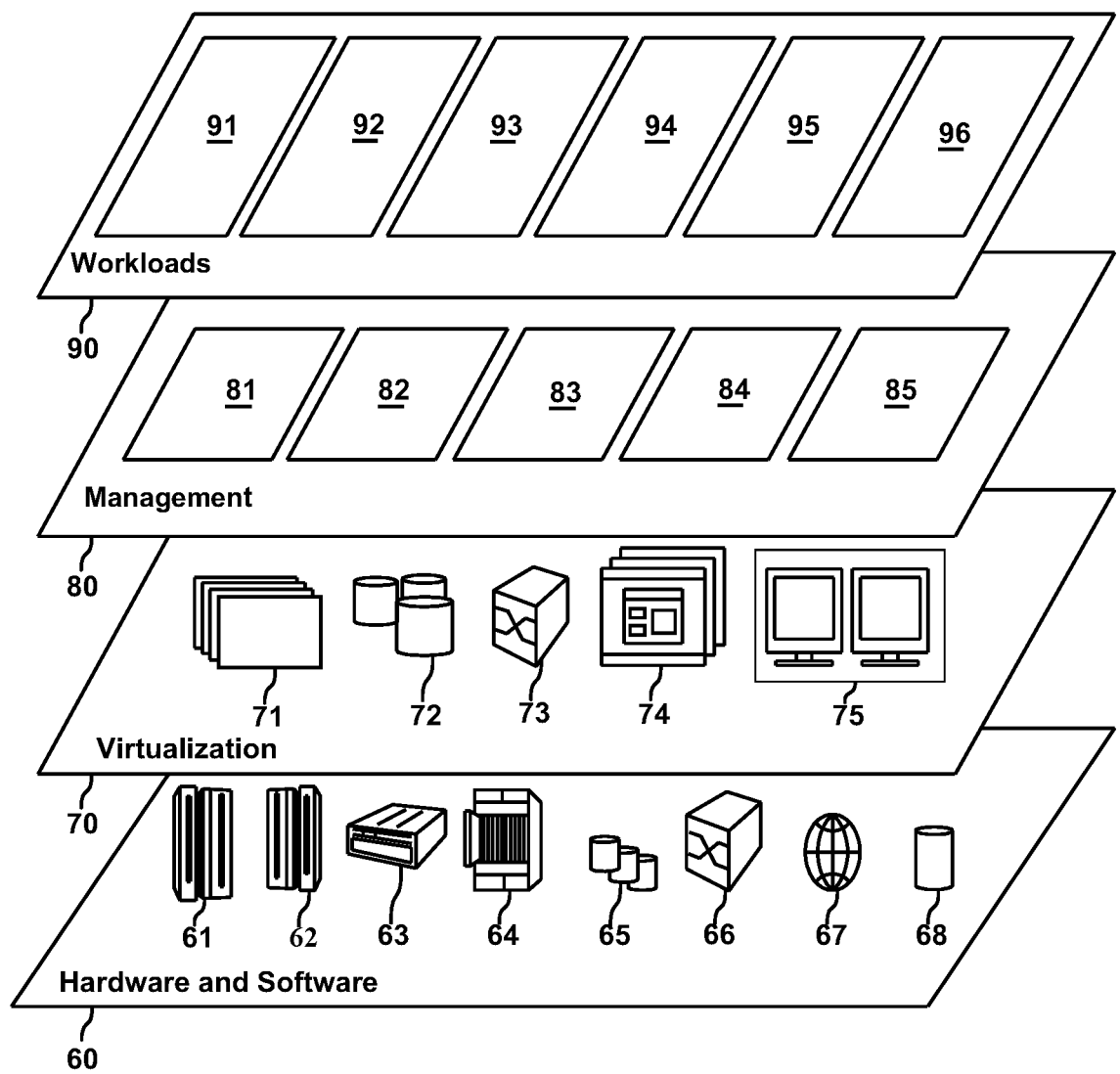
FIG. 3 is a functional block diagram illustrating abstraction model layers in the cloud computing environment, in accordance with an embodiment of the present invention.

Referring now to FIG. 3, FIG. 3 is a functional block diagram illustrating abstraction model layers in cloud computing environment 50, in accordance with an embodiment of the present invention. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and environment monitoring 96. The functionalities of environment monitoring will be described in the following embodiment of the present disclosure.

Figure 4:
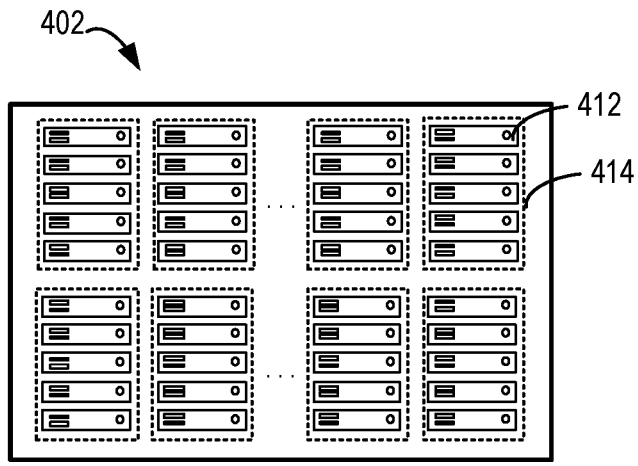
FIG. 4 is a functional block diagram illustrating a space enclosing electronic devices, in accordance with an embodiment of the present invention.

As mentioned above, it is desired to monitor environmental conditions associated with electronic devices. The environment monitoring can be especially important for large installations of electronic devices, such as server farms or large device racks close together. FIG. 4 is a functional block diagram illustrating space 402 enclosing electronic devices 412, in accordance with an embodiment of the present invention. As used herein, the term "space" refers to any enclosed, three-dimensional region, such as a room in a building. In some embodiments, space 402 can be a data center. Examples of electronic devices 412 can be servers, computers, communication equipment, storage devices, disk drives, and/or any other electronic devices known in the art.

There can be a large number of electronic devices disposed in space 402 in some cases. For space saving and/or efficient management, some or all of electronic devices 412 can be carried in one or more racks 414. In various embodiments, large space 402 can have hundreds or even thousands of racks 414 and thus the number of electronic devices 412 can increase and the number of racks 414 increases.

The proper operation of electronic devices 412 depends on environmental conditions surrounding the devices. For example, electronic devices 412 can be sensitive to ambient parameters in their vicinities. The ambient parameters can include temperature, humidity, vibration, light, pressure, air velocity, dust, radon level, or smoke concentration. Electronic devices 412 need to operate in a physical environment with desired ranges of ambient parameters. Fast detection of failed operation of one or more electronic devices can help maintain, repair, and/or replace the failed electronic devices and thus ensure the overall operational performance. The ambient parameters and/or the devices' operational status can change due to internal processing of the devices, external environment changes, manual behavior intervention, and/or the like.

It is to be understood that the space, the number of electronic devices, and/or the arrangement in FIG. 4 is only for the purpose of illustration without suggesting any limitation. A different number of electronic devices, different types of electronic devices, and/or a different arrangement of the devices can be located in a certain space for storage and/or operation.

Figure 5:
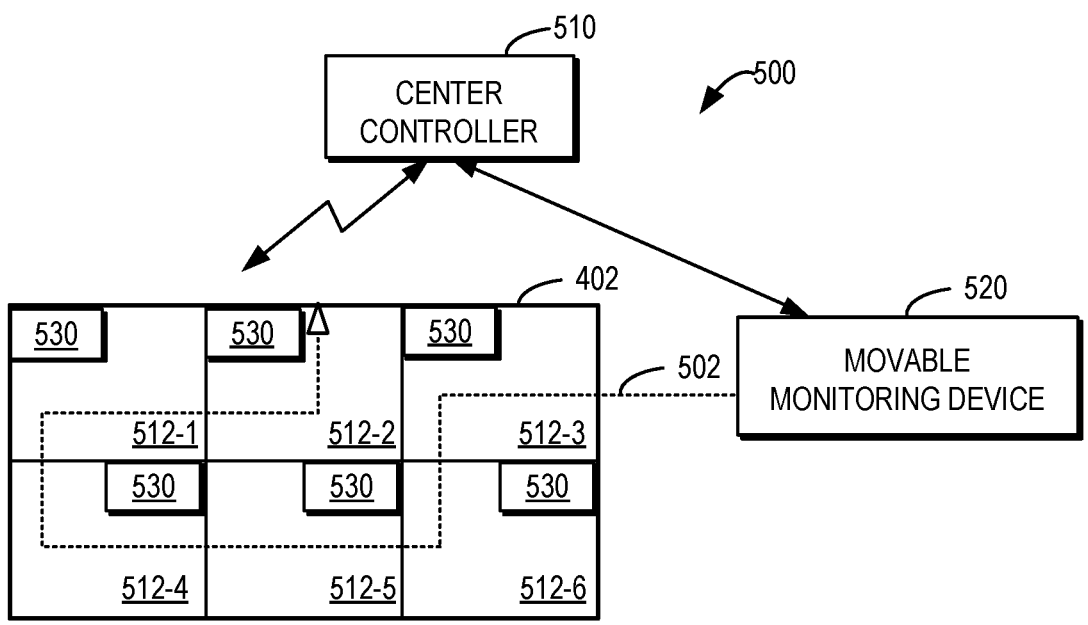
FIG. 5 is a functional block diagram illustrating a monitoring system within the space enclosing electronic devices, in accordance with an embodiment of the present invention.

Reference is now made to FIG. 5, is a functional block diagram illustrating monitoring system 500 within space 420 enclosing electronic devices 412, in accordance with an embodiment of the present invention. The monitoring system 500 is arranged for monitoring environmental conditions in a space enclosing electronic devices (e.g., space 402 of FIG. 4).

In the depicted embodiment, monitoring system 500 includes center controller 510, moveable monitoring device 520, and sensor 530. In embodiments of the present disclosure, center controller 510 is configured to dynamically determine movement path 502 for moveable monitoring device 520 based at least in part on environmental conditions detected by a plurality of sensors 530. In other embodiments center controller 510 is configured to dynamically determine movement path 502 for moveable monitoring device 520 based at least in part on environmental conditions detected by one or more sensors 530. In various embodiments, moveable monitoring device 520 can move along determined movement path 502 through space 402. In various embodiments, moveable monitoring device 520 and sensor 530 are communicatively coupled to center controller 510 in wired and/or wireless connections. Sensor 530 can be one or more sensors or a plurality of sensors.

In various embodiments, space 402 with electronic devices to be monitored by monitoring system 500 can be divided into a plurality of regions, for example, regions 512-1 to 512-6 (collectively or individually referred to as regions 512), each having one or more electronic devices 412 located therein. For purpose of clarity, electronic devices 412 are not shown in regions 512. Different regions 512 can be the same or different sizes. Although six regions are shown in the example of FIG. 5, it would be appreciated that the number of divided regions and the manner of the space division are not limited in this regard.

In the depicted embodiment, sensor 530 disposed in regions 512 can detect environmental conditions with a regional granularity (hereinafter referred to as regional-level environmental conditions). As such, a small number of sensors are required to be fixed in space 402, which reduces the installation cost and maintenance cost.

As used herein, an environmental condition, in a regional-level environmental condition(s), refers to any condition that can affect maintenance, repair, operation, and/or performance of the electronic devices. In some embodiments, electronic devices 412 can be sensitive to ambient conditions of a physical environment where electronic devices 412 are located, and thus the environmental conditions can include ambient parameters measured in the physical environment. Some examples of the ambient parameters are temperature, humidity (such as absolute humidity and/or relative humidity), vibration, light, pressure, air velocity, concentration of any substances, e.g. pollutants, dust, smoke, harmful gas, and/or any other ambient parameters known in the art. Maintaining the ambient parameters within desired or predetermined ranges is usually important, especially in an enclosed space.

The environmental conditions can additionally or alternatively include operational status of electronic devices 412. The operational status is related to operation or processing of electronic device 412, which can include normal status, failure status (such as a hardware failure and/or a software failure), power-off status, degradation status, and/or any other abnormal status of electronic devices 412 known in the art.

The operational status of electronic device 412 can include those that can be monitored and detected from the outside of the electronic device 412. For example, electronic device 412 can have one or more malfunction indicator lamps or other visual or audible indicators/alarms to indicate the corresponding operational status of device 412. By visually or audibly detecting the status of such indicators, it is possible to determine the operational status. In addition, the image capturing electronic device 412 can be analyzed to indicate whether there is any hardware damage, disconnection and/or misconnection of wires and interfaces, and/or any other risk occurred with respect to the electronic device 412.

In the example shown in FIG. 5, each region 512 has a single sensor 530 deployed therein. Sensor 530 can be installed at any appropriate location in the respective regions 512 for environment monitoring. In some embodiments, one or more sensor 530 can be deployed in each of regions 512 to detect different types of region-level environmental conditions in one or more regions 512. Region-level environmental conditions are environmental conditions in one or more regions 512. In some embodiments, more than one sensor 530 can be deployed in a region 512 to detect the same type of environmental condition. In some embodiments, sensor 530 in different regions 512 can be the same type of sensor to detect the same environmental condition. In some other embodiments, sensor 530 in regions 512 can be of different types of sensors to detect different environment conditions in different regions 512. In various embodiments, sensors 530 can be instructed to detected one or more predetermined environment conditions in the same or different regions 512.

Depending on the environmental conditions desired to be detected, sensor 530 can be selected as one or more of temperature sensors, humidity sensors, vibration sensors, motion detectors, seismic detectors, air pressure sensors, air flow sensors, moisture detectors, sensors for detecting concentration of certain substances (such as pollutant detector, dust detector, smoke detectors, and/or harmful gas detectors), imaging sensors (such as infrared cameras and/or visual-light cameras), acoustic sensors, and/or other types of sensors for detecting and measuring a desired environmental condition known in the art.

Generally, the environmental conditions can be spatially different. For example, due to heat dispersion from running electronic devices 412, different temperatures can present in the vicinity of different electronic devices 412 in one or more regions 512. A region-level environmental condition can indicate an overall condition within region 512, but probably cannot accurately reflect whether an environmental condition of one or more electronic devices 412 in a particular region 512. Specifically, in one embodiment, an ambient parameter can indicate an average value of a corresponding condition of the physical environment in one or more regions 512 or a specific value of the condition at the location where one or more sensor(s) 530 is located. In various embodiments, the operational status can indicate that there are one or more electronic devices 412 operating in an abnormal status within the region 512 but cannot locate the exact abnormal devices or identify the operations of other electronic devices 412 within region 512.

To detect more accurate environmental conditions of the individual electronic devices 412, monitoring system 500 includes moveable monitoring device 520 to perform device-level environment monitoring. The environment monitoring of device 520 is controlled by center controller 510.

Specifically, sensor 530 can continually detect respective or predetermined region-level environmental conditions in regions 512 and can transmit data (such as a sensing signal) to center controller 510. Center controller 510 can be any control device known in the art, including at least one or more processors/processing units. Although shown as separate devices, center controller 510 can be integrated in moveable monitoring device 520 in some embodiments. In an embodiment of distributed deployment, center controller 510 can be located in space 402 or at any location near to or remote from space 402.

Center controller 510 can receive explicit indications of the region-level environmental conditions from sensor 530 or can receive raw sensing data. In various embodiments, center controller 510 can determine one or more region-level environmental conditions by analyzing the raw sensing data. In various embodiments, upon obtaining the region-level environmental conditions, center controller 510 can determine respective region priorities of regions 512. A region priority indicates a probability of occurrence of a risk event in the corresponding region 512. In some embodiments of environment monitoring, region 512 with a higher probability of occurrence of a risk event can be monitored first or relatively earlier. Thus, in some embodiments, region 512 with a higher probability can be assigned with a higher region priority for monitoring and/or inspection.

The risk event can include any event that would affect the maintenance, repair, operation and/or performance of electronic devices 412. In some embodiments, the risk event can include detection of an ambient parameter exceeding and/or below a predetermined range. As an example, for electronic devices 412 sensitive to temperature, if it is detected that the temperature in a region 512 is approaching to a value exceeding an upper limit or below a lower limit of a suitable temperature range for any of electronic devices 412 in this region 512, center controller 510 can determine that a risk event can probably occurred in this region. As such, a higher region priority can be set to this region. Center controller 510 can also determine whether a risk event has occurred or might occur based on any other ambient parameters to which electronic devices 412 are sensitive. In another example, if the region-level operational status indicates that some electronic devices 412 in a region 512 are under failure status, center controller 510 can also determine a higher probability of occurrence of a risk event in this region 512.

In some embodiments, different types of risk events can be assigned with corresponding weights to indicate contributions of the risk events to the region priorities. In various embodiments, if the occurrence of one or more risk events are detected from the region-level environmental conditions of a region 512, then the region priority can be determined by weighting the probabilities of the risk events with the corresponding weights. In some embodiments, if more possible risk events are detected to have occurred in one or more regions 512, a higher region priority is assigned to the one or more regions 512 associated with the detected risk events.

In some embodiments, center controller 510 can determine the region priorities further based on historical information related to regions 512 in addition to the region-level environmental conditions detected in real-time. The historical information can include occurrence frequencies of risk events in regions 512. The risk events historically occurred in one or more regions 512 can be detected based on historical region-level environmental conditions detected by sensor 530 and/or historical device-level environmental conditions detected by the moveable monitoring device 520, further described below. If the risk events were frequently occurred in a particular region 512 in the past, the probability of a risk event occurring in the same particular region 512 can be higher than a particular region 512 that hasn't had a risk event and thus the region priority can be higher for the particular region 512 that has had risk events in the past.

The historical information can include a historical movement path of moveable monitoring device 520 through regions 512 and/or historical region priorities of regions 512. A movement path can indicate the monitoring order of regions 512 through which moveable monitoring device 520 passes. The historical movement path can be the last movement path of the moveable monitoring device 520. The historical region priorities can be used to determine the historical movement path, as will be described below.

In various embodiments, with the historical movement path and/or the region priorities, center controller 510 can determine the (relative) time lengths of the respective regions 512 since their last monitoring. In other embodiments, center controller 510 can monitor the regions 512 based on a predetermined time. In some embodiments, center controller 510 can determine that a higher region priority for a particular region 512 if the particular region 512 is the earlier or earliest region 512 that was monitored by the moveable monitoring device 520. A risk event might more likely happen in this region 512 since a larger period of time has passed. In some embodiments, the historical region priorities can be directly considered in determining the current historical region priorities for regions 512.

In the cases where both the region-level environmental conditions and one or more different types of historical information are considered in determining the region priorities, in some embodiments, contributions of the region-level environmental conditions and one or more different types of historical information can be measured by different weights. Center controller 510 can determine the region priorities by weighting the above factors.

It has been described above that the current region-level environmental conditions and the historical information can be used to determine the region priorities. It would be appreciated that other factors can also affect the region priorities, in other embodiments. For example, regions 512 can be assigned with predetermined importance levels, which can indicate that electronic devices 412 in these regions can be more important and/or more sensitive to the environmental conditions. Center controller 510 can determine the region priorities based on the importance levels as well as the factors described above.

Center controller 510 determines a movement path 502 of moveable monitoring device 520 through regions 512 based on the region priorities. A movement path can indicate the monitoring order of regions 512, as mentioned above, and thus can define a track of moveable monitoring device 520 within space 402. In some embodiments, center controller 510 can determine movement path 502 to allow moveable monitoring device 520 to move to a region having a higher priority earlier than to a region having a lower priority.

FIG. 5 shows an example of movement path 502 determined for moveable monitoring device 520, which indicates that moveable monitoring device 520 can first move to the region 512-3 and then move to regions 512-6, 512-5, 512-4, 512-1, and 512-2 sequentially. It would be appreciated that movement path 502 is merely shown as an example only and other possible movement paths can be determined in actual applications.

Movement path 502 can be used by moveable monitoring device 520 to detect environmental conditions with a device granularity (hereinafter referred to as device-level environmental conditions). In some embodiments, center controller 510 can instruct moveable monitoring device 520 to detect the device-level environmental conditions, for example, in the cases that center controller 510 and moveable monitoring device 520 are separate devices. In some embodiments, when center controller 510 is implemented together with the moveable monitoring device 520, moveable monitoring device 520 can directly detect the device-level environmental conditions under control of center controller 510.

To detect the device-level environmental conditions, moveable monitoring device 520 can move within space 402 according to movement path 502. Upon arrival of one or more regions 512, moveable monitoring device 520 can monitor one or more individual electronic devices 412 located in one or more regions 512. The dynamic determination of the movement path can allow efficient and accurate collection of environmental conditions of the devices. The arrangement and operations of the movable monitoring device 520 will be described in detail below.

A device-level environmental condition can indicate the environmental condition associated with an individual electronic device 412 more accurately as compared with the region-level environmental condition. Moveable monitoring device 520 can detect device-level environmental conditions of the same and/or different types electronic devices 412 from the region-level environmental conditions detected by sensor 530. For example, the device-level environmental conditions can include one or more ambient parameters of the physical environment in the vicinity of individual electronic devices 412. The device-level environmental conditions can alternatively or additionally include one or more operational status of one or more electronic devices 412.

In various embodiments, one or more regions 512 can each have one or more electronic devices 412 located therein. In various embodiments, center controller 510 can determine a monitoring order of a plurality of electronic devices 412 located in a certain region 512, such that moveable monitoring device 520 can monitor electronic devices 412 according to the determined monitoring order. In some embodiments, for one or more regions 512 having two or more electronic devices 412, center controller 510 can determine a corresponding monitoring order for electronic devices 412 in one or more regions 512.

The monitoring order for one or more regions 512 can be determined based at least in part on device priorities of electronic devices 412 in one or more regions 512. Similarly, to the region priority, a device priority can indicate a probability of occurrence of a risk event with respect to a corresponding electronic device 412. As mentioned above, a risk event can include any event that would affect the maintenance, repair, operation and/or performance of electronic device 412. In various embodiments, when determining a device priority of electronic device 412, the risk event(s) occurred within or near the electronic device 412 is taken into account by movable monitoring device 520.

In some embodiments, center controller 510 can determine the device priorities based on historical information related to electronic devices 412 in the specific region 512. The historical information can include occurrence frequencies of risk events with respect to electronic devices 412 in this region. The risk events historically occurred with respect to electronic devices 412 can be detected based on historical device-level environmental conditions detected by the moveable monitoring device 520. The detection of the risk events from the device-level environment conditions can be similar as the detection of the risk event from the region-level environment conditions as described above. For example, if risk events are frequently occurring with respect to electronic device 412 in the past, the probability of a risk event occurring at a future point in time will be higher and thus the device priority will also be higher.

In various embodiments, the historical information can include historical device priorities of electronic devices 412 and/or a historical monitoring order of electronic devices 412 in one or more regions 512. With the historical monitoring order and/or the device priorities, center controller 510 can determine the (relative) time lengths of the respective electronic devices 412 since their last monitoring. In some embodiments, center controller 510 can determine a higher device priority for electronic device 412 if this electronic device 412 is the earlier or earliest one that was monitored by moveable monitoring device 520 in the specific region 512.

In some embodiments, moveable monitoring device 520 can monitor one or more electronic devices 412 of one or more regions 512 that is near, based on a predetermined distance, to moveable monitoring device 520 when moveable monitoring device 520 first enters into region 512. The device-level environmental condition associated with the one or more monitored electronic devices 412 can be provided to center controller 510 to determine the monitoring order of the remaining electronic devices 412 in a particular region 512. In these embodiments, the one or more electronic devices 520 that have been monitored can be considered as having higher ranked locations in the monitoring order.

If center controller 510 determines from the current device-level environmental conditions that one or more risk events has occurred or probably will occur with respect to the detected electronic device(s) 412, then one or more other electronic devices 412 located close to the detected electronic device(s) 412 with risk events can be determined as having higher device priorities. This is especially beneficial when the risk events are related to undesired ambient parameters.

In the cases where both one or more different types of historical information and some detected device-level environmental conditions are considered in determining the device priorities, in some embodiments, contributions of these factors can be measured by different weights. Center controller 510 can determine the device priorities by weighting the above factors.

It has been described above that the current device-level environmental conditions and the historical information can be used to determine the device priorities. It would be appreciated that other factors can also affect the device priorities in other embodiments. For example, electronic devices 412 in a particular region 512 can be assigned with predetermined importance levels, which can indicate that one or more electronic devices 412 can be more important and/or more sensitive to the environmental conditions. Center controller 510 can determine the device priorities based on the importance levels as well as the factors described above.

In some embodiments, when the device priorities for one or more regions 512 are available, center controller 510 can determine movement path 502 further based on the device priorities in addition to the region priorities. In some embodiments, according to the device priorities, center controller 510 can determine whether there are one or more regions 512 with electronic devices 412 having higher priorities than electronic devices 412 in other regions 512. Center controller 510 can then determine movement path 502 to enable moveable monitoring device 520 to move to the one or more regions 512 having higher priorities earlier than the other regions 512.

In some embodiments, the device priorities for one or more region 512 can be used by center controller 510 to determine movement path 502 of moveable monitoring device 520 within the one or more region 512. That is, center controller 510 can determine a fined movement path 502 to indicate how moveable monitoring device 520 moves in the region 512. The movement of moveable monitoring device 520 within a region 512 can depend on the device priorities or depend on the monitoring order of electronic devices 412 determined from the device priorities. Movement path 502 can be determined such that moveable monitoring device 520 can move to a location of electronic device 412 having a higher priority than to a location of electronic device 412 having a lower priority.

Center controller 510 can instruct moveable monitoring device 520 to move along the monitoring path 502 through regions 512 and/or instruct moveable monitoring device 520 to monitor electronic devices 412 in one or more regions 512 according to the determined monitoring orders for these regions. In the depicted embodiment shown in FIG. 5, center controller 510 and moveable monitoring device 520 are separate devices, center controller 510 can transmit indications of movement path 502 and probably the monitoring order(s) to the moveable monitoring device 520. In some embodiments, center controller 510 and moveable monitoring device 520 can be a single device.

Moveable monitoring device 520 can have any structure that supports free movement in space 402. In some embodiments, moveable monitoring device 520 includes at least one or more sensors 530 for detecting the device-level environmental conditions. The number and type of the sensors included in moveable monitoring device 520 can depend on the device-level environmental conditions to be detected.

Figure 6A:
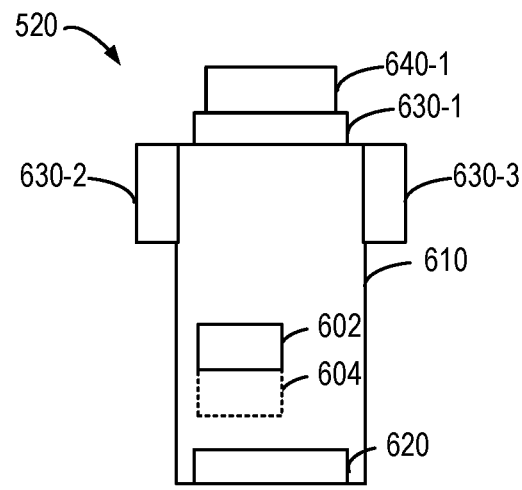
FIG. 6A and FIG. 6B are schematic diagrams of a moveable monitoring device, in according with an embodiment of the present invention.

FIG. 6A is a schematic diagram of a moveable monitoring device 520, in accordance with an embodiment of the present invention. In should be noted that FIG. 6A depicts an example of moveable monitoring device 520 according to one embodiment of the present invention. As shown, moveable monitoring device 520 includes main body 610, driving assembly 620 for driving movement of moveable monitoring device 520, controller 602, and one or more sensors (e.g., sensor 640-1, sensor 640-2, sensor 640-3 . . . sensor 640-$n$) for detecting environmental conditions.

Controller 602 is configured to obtain one or more movement path 502 from center controller 510. In some embodiments, moveable monitoring device 520 can include transceiver 604 to obtain an indication of movement path 502 from center controller 510. In the embodiments where center controller 510 is integrated in moveable monitoring device 520 (for example, in controller 602), such transceiver 604 may not be needed.

Controller 602 is further configured to control driving assembly 620 to drive moveable monitoring device 520 to move along movement path 502 and control one or more sensors (e.g., sensor 640-1, sensor 640-2, sensor 640-3 . . . sensor 640-$n$) to detect device-level environmental conditions associated with electronic devices 412 when arriving at a particular region 512. In some embodiments, controller 602 can obtain, for example, through transceiver 604, a monitoring order of electronic devices 412 located in a particular region 512 and then can control sensors (e.g., sensor 640-1, sensor 640-2, sensor 640-3 . . . sensor 640-$n$) to monitor electronic devices 412 in the particular region 512 according to the obtained order. The sensing data of the sensors (e.g., sensor 640-1, sensor 640-2, sensor 640-3 . . . sensor 640-$n$) can be transmitted to controller 602 or center controller 510 through wireless and/or wired connections therebetween.

Driving assembly 620 is operable for driving movement of device 520 with a predetermined speed or variable speeds. Driving assembly 620 can be designed with any structure and include any components that can support the movement of the device 520. For example, driving assembly 620 can include a motor-driven assembly, including a motor, a transmission unit, and/or other suitable components.

The sensors are arranged in moveable monitoring device 520 to detect environmental conditions. In some embodiments, to achieve more flexibility in detecting the environmental conditions, moveable monitoring device 520 can include one or more retractable parts and the sensors can be attached to such retractable parts. As shown in FIG. 6A, moveable monitoring device 520 includes retractable parts 630-1, 630-2, and 630-3 (collectively or individually referred to as retractable parts 630) attached to main body 610. In various embodiments, retractable parts 630 have an extended status in which it appears to have a smaller size and a compressed status in which it appears to have a large size.

In some embodiments, retractable parts 630 can be extended in a vertical direction. For example, retractable part 630-1, which is arranged on the top of main body 610, is operable to lift to different heights in its extended status. In various embodiments, one or more sensors (e.g., sensor 640-1, sensor 640-2, sensor 640-3 . . . sensor 640-$n$) of moveable monitoring device 520 can be attached to the retractable part 630-1 and can be lifted up along with the extension of the retractable part 630-1 so as to detect the environmental condition at a corresponding height. In some embodiments, sensor 640-1 can include a camera, such as a camera that can rotate and take pictures at different angles. It would be appreciated that more than one sensor of the same or different types can be attached to the retractable part 630.

Figure 6B:
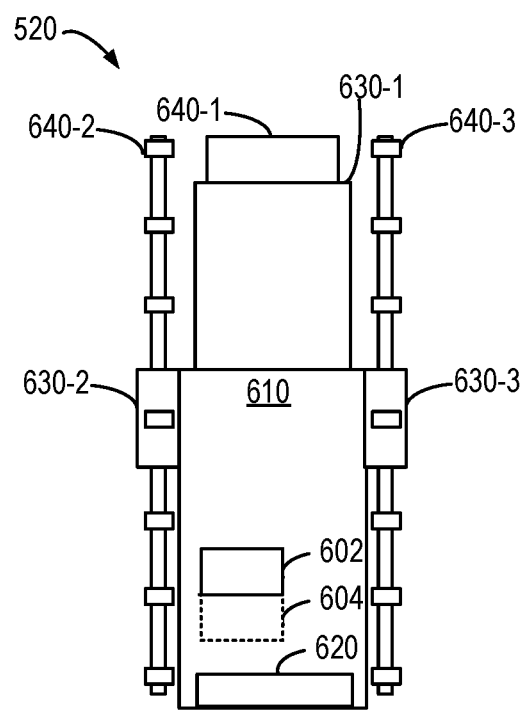

In some embodiments, retractable parts 630-2 and 630-3 can be arranged at two opposite sides of main body 610 and can also be extended to different heights in a vertical direction. One or more sensors (sensor 640-2 and sensor 640-3) can be attached to each of retractable parts 630-2 and 630-3 and can be accommodated into compressed retractable parts 630-2 and 630-2. FIG. 6B is a schematic diagram of a moveable monitoring device 520, in accordance with an embodiment of the present invention. In should be noted that FIG. 6B depicts an example of moveable monitoring device 520 according to one embodiment of the present invention. FIG. 6B shows an example where retractable parts 630-2 and 630-3 are in their extended status. As shown, a plurality of sensors 640-2 are arranged on extended part 630-2 and a plurality of sensors 640-3 are arranged on extended part 630-3.

In some embodiments, sensors 640-2 on retractable part 630-2 and sensors 640-3 on retractable part 630-3 can be of different types. In an embodiment, sensors 640-2 can include sensors that are suitable for measuring the ambient parameters. Of course, the same or different types of sensors for detection of the ambient conditions can be arranged on retractable part 640-2. In some embodiments, sensors 640-2 can include at least temperature sensors and humanity sensors. Sensors for monitoring of other ambient parameters can also be possible. Sensors 640-2 can be arranged evenly on extended part 630-2.

In an embodiment, sensors 640-3 can include sensors that are suitable for capturing image data, such as the same or different types of cameras. Sensors 640-3 can be arranged at different heights of extended part 630-3. The intervals of sensors 640-3 can be determined based on the vertical distances of the electronic devices to be monitored.

Retractable parts 630 can help enable efficient environment monitoring by extending sensors in a vertical direction enabling monitoring device 520 to be more suitable for environment monitoring of electronic devices disposed at different heights (such as in racks). In some embodiments, the largest extension height of the retractable parts 630 can be designed according to the largest heights of the disposed electronic devices 412 to be monitored. Although the vertical extension of the retractable parts is described, in some other embodiment, the horizontal extension is also possible such that the sensors arranged on the retractable parts can detect the electronic devices arranged at the same height simultaneously.

Controller 602 can control the extended and compressed status of the retractable parts 630 and the degrees of their extension depending on based on the locations of electronic devices 412 to be monitored. For example, the retractable parts 630-1, 630-2, and 630-3 can in the compressed status during the movement of the monitoring device 520. In various embodiments, when the monitoring device 520 arrives at one or more regions 512, controller 602 can control the retractable parts 630-1, 630-2, and/or 630-3 to extend to certain heights such that the sensors 640 arranged thereon can monitor the electronic device(s) 412 disposed on the higher shelves.

It would be appreciated that the arrangement of the components in moveable monitoring device 520 is provided for purpose of illustration. In other embodiments, one or more sensors, retractable parts, and other components can be included in or omitted from the moveable monitoring device 520, and a different arrangement of those components is also possible in other embodiments. In some embodiments, the sensors arranged on the retractable parts 630-2 and 630-3 can be of the same types.

The usage of the detected device-level environmental conditions is not limited in the scope of the present invention. In some embodiments, center controller 510, controller 602, and/or other devices can perform device maintenance or environment management based on the detected device-level environmental conditions. For example, center controller 510 or controller 602 can determine from the detected device-level environmental condition whether one or more risk events can occur or has occurred with respect to one or more electronic devices 412. The detection of the risk events from the device-level environment conditions can be similar as the detection of the risk event from the region-level environment conditions as described above.

Center controller 510 and/or controller 602 can determine and instruct corresponding actions to be performed in response to the risk events. For example, if it is detected that the temperature in the vicinity of electronic device 412 is higher than an upper limit of the desired temperature range, center controller 510 can perform thermal management, for example, by instructing cooling equipment to decrease the temperature, instructing a carriage device to move electronic device 412 to a suitable location, and/or alerting an Information Technology (IT) professional or supporting staff members of the detected risk event. Similarly, if an ambient parameter is not within the desired range and/or device failure occurs with respect to electronic device 412, center controller 510 can instruct corresponding serving equipment to work properly and/or can send an alarm to one or more supporting staff members.

Figure 7:
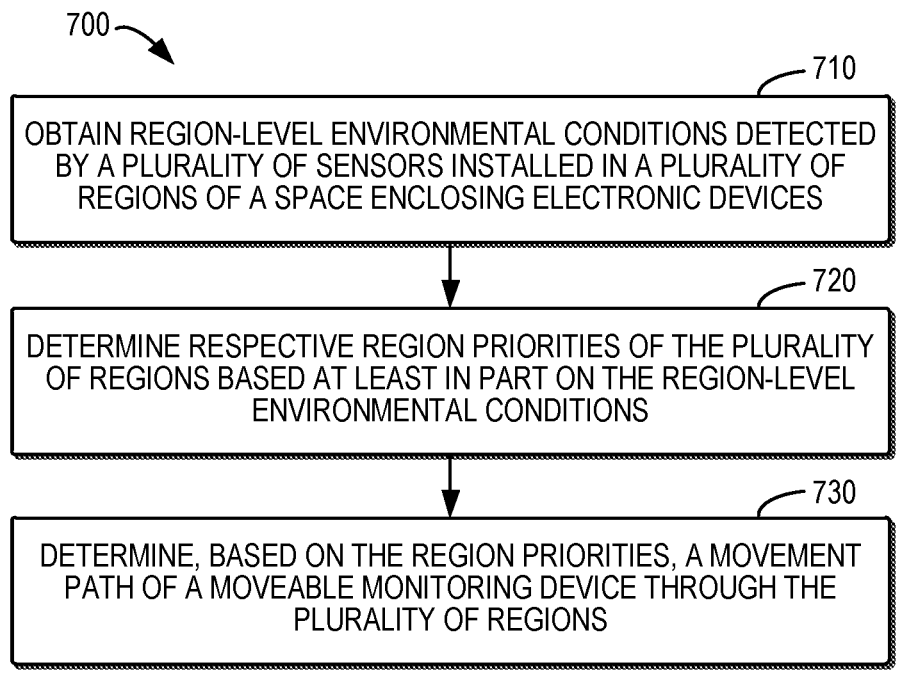
FIG. 7 illustrates operational steps of the moveable monitoring device within the space enclosing electronic devices, in accordance with an embodiment of the present invention.

FIG. 7 shows a flowchart of an example method 700 according to an embodiment of the present disclosure. The method 700 can be implemented at a center controller 510 as shown in FIG. 5. For the purpose of discussion, the method 700 will be described from the perspective of center controller 510 with reference to FIG. 5.

At block 710, center controller 510 obtains region-level environmental conditions detected by a plurality of sensors installed in a plurality of regions of a space enclosing electronic devices. At block 720, center controller 510 determines respective region priorities of the plurality of regions based at least in part on the region-level environmental conditions, a region priority indicating a probability of occurrence of a risk event within a corresponding region. At block 730, center controller 510 determines, based on the region priorities, a movement path of a moveable monitoring device through the plurality of regions for detecting device-level environmental conditions associated with the electronic devices.

In some embodiments, determining the region priorities further comprises determining the region priorities further based on at least one of the following: a historical movement path of the moveable monitoring device through the plurality of regions, occurrence frequencies of risk events in the plurality of regions, and historical region priorities of the plurality of regions.

In some embodiments, the method 700 further comprises: for a given region of the plurality of regions having a plurality of electronic devices located therein, determining, by one or more processors, respective device priorities of the plurality of electronic devices, a device priority indicating a probability of occurrence of a risk event with respect to a corresponding electronic device; and determining, based on the device priorities, a monitoring order of the plurality of electronic devices for monitoring of the moveable monitoring device.

In some embodiments, determining the device priorities comprises: determining, by one or more processors, the device priorities based on at least one of the following: occurrence frequencies of risk events with respect to the plurality of electronic devices, historical device priorities of the plurality of electronic devices, a historical monitoring order of the plurality of electronic devices, and a current device-level environmental condition associated with at least one of the plurality of electronic devices that is detected by the moveable monitoring device.

In some embodiments, the method 700 further comprises: instructing, by one or more processors, the moveable monitoring device to detect the device-level environmental conditions associated with the plurality of devices according to the monitoring order.

In some embodiments, at least one of the region-level environmental conditions and the device-level environmental conditions indicates at least one of the following: ambient parameters of a physical environment and operational status of the electronic devices.

In some embodiments, determining the movement path comprises: determining, by one or more processors, the movement path to allow the moveable monitoring device to move to a region having a higher priority earlier than to a region having a lower priority.

In some embodiments, the method 700 further comprises: instructing, by one or more processors, the moveable monitoring device to move along the movement path.

It should be noted that the processing of environment monitoring or the processing achieved by the moveable monitoring device according to embodiments of this disclosure could be implemented by computer system/server 12 of FIG. 1.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   obtaining, by a center controller, region-level environmental conditions detected by a plurality of sensors installed in a plurality of regions of a space enclosing one or more electronic devices;
   determining, by the center controller, respective region priorities of the plurality of regions based at least in part on the region-level environmental conditions, a region priority indicating a probability of occurrence of a risk event within a corresponding region;
   determining, by the center controller, based on the region priorities, a movement path of a moveable monitoring device through the plurality of regions for detecting device-level environmental conditions associated with the electronic devices, wherein risk events are assigned with corresponding weights to indicate contributions of the risk events to region priorities;
   enabling, by the center controller, the moveable monitoring device to move to a region having a higher priority earlier than to a region having a lower priority; and
   instructing, by the center controller, the moveable monitoring device to monitor the one or more electronic devices in the plurality of regions based on determined monitoring orders for the plurality of regions, wherein the moveable monitoring device detects device-level environmental conditions of same or different types electronic devices from the region-level environmental conditions detected.

2. The method of claim 1, wherein determining the region priorities further comprises:
   determining, by the center controller, the region priorities further based on at least one of the following: a historical movement path of the moveable monitoring device through the plurality of regions, occurrence frequencies of risk events in the plurality of regions, and historical region priorities of the plurality of regions.

3. The method of claim 1, further comprising: for a given region of the plurality of regions having a plurality of electronic devices located therein,
   determining, by the center controller, respective device priorities of the plurality of electronic devices, a device priority indicating a probability of occurrence of a risk event with respect to a corresponding electronic device; and
   determining, by the center controller and based on the device priorities, a monitoring order of the plurality of electronic devices for monitoring of the moveable monitoring device,
   wherein the determining of the movement path is further based on the device priorities.

4. The method of claim 3, wherein determining the device priorities comprises:
   determining, by the center controller, the device priorities based on at least one of the following:
      occurrence frequencies of risk events with respect to the plurality of electronic devices,
      historical device priorities of the plurality of electronic devices,
      a historical monitoring order of the plurality of electronic devices, and a current device-level environmental condition associated with at least one of the plurality of electronic devices that is detected by the moveable monitoring device.

5. The method of claim 3, further comprising:
instructing, by the center controller, the moveable monitoring device to detect the device-level environmental conditions associated with the plurality of devices according to the monitoring order.

6. The method of claim 1, wherein at least one of the region-level environmental conditions and the device-level environmental conditions indicates at least one of the following: ambient parameters of a physical environment and operational status of the electronic devices.

7. The method of claim 1, wherein determining the movement path comprises:
determining, by the center controller, the movement path to allow the moveable monitoring device to move to a region having a higher priority earlier than to a region having a lower priority.

8. The method of claim 1, further comprising:
instructing, by the center controller, the moveable monitoring device to move along the movement path.

9. A moveable monitoring device, comprising:
a main body;
a driving assembly coupled to the main body for drive movement of the moveable monitoring device;
at least one sensor coupled to the main body; and
a controller configured to:
  obtain a movement path of the moveable monitoring device through a plurality of regions in a space enclosing electronic devices, the movement path being based on region-level environmental conditions detected by a plurality of sensors installed in the plurality of regions, wherein risk events are assigned with corresponding weights to indicate contributions of the risk events to region priorities,
  instruct the driving assembly to drive the moveable monitoring device to move along the movement path, and
  instruct the at least one sensor to detect device-level environmental conditions associated with the electronic devices; and
  instruct the moveable monitoring device to monitor the one or more electronic devices in the plurality of regions based on determined monitoring orders for the plurality of regions, wherein the moveable monitoring device detects device-level environmental conditions of same or different types electronic devices from the region-level environmental conditions detected.

10. The device of claim 9, wherein the controller is configured to:
obtain a monitoring order of a plurality of electronic devices located at a certain region of the plurality of regions.

11. The device of claim 10, wherein the controller is configured to:
in response to the moveable monitoring device arriving at the region, control the at least one sensor to detect device-level environmental conditions associated with the plurality of electronic devices according to the monitoring order.

12. The device of claim 10, wherein the electronic devices are disposed at different heights, and the moveable monitoring device further comprising:
at least one retractable part coupled to the main body and having the at least one sensor arranged thereon, and
wherein the controller is further configured to:
in response to the moveable monitoring device arriving at one of the plurality of regions, control the at least one retractable part to extent to a height to enable the at least one sensor to detect the device-level environmental condition associated with an electronic device disposed at the height.

13. The device of claim 12, wherein the at least one retractable part comprises a first retractable part arranged at a first side of the main body and a second retractable part arranged at a second opposite side of the main body, and
wherein the at least one sensor comprises at least one sensor of a first type arranged on the first retractable part and at least one sensor of a second type arranged on the second retractable part.

14. The device of claim 13, wherein the at least one sensor of the first type comprises a first plurality of sensors evenly arranged on the first retractable part for measuring ambient parameters; and
wherein the at least one sensor of the second type comprises a second plurality of sensors arranged on the second retractable part at different heights for capturing image data.

15. The device of claim 12, wherein the at least one retractable part comprises a third retractable part coupled to a top of the main body, and wherein the at least one sensor comprises a sensor for capturing image data.

16. A system comprising:
a processing unit; and
a memory coupled to the processing unit and storing instructions thereon, the instructions, when executed by the processing unit, performing acts comprising:
  obtaining region-level environmental conditions detected by a plurality of sensors installed in a plurality of regions of a space enclosing electronic devices;
  determining respective region priorities of the plurality of regions based at least in part on the region-level environmental conditions, a region priority indicating a probability of occurrence of a risk event within a corresponding region; and
  determining, based on the region priorities, a movement path of a moveable monitoring device through the plurality of regions for detecting device-level environmental conditions associated with the electronic devices, wherein risk events are assigned with corresponding weights to indicate contributions of the risk events to region priorities;
  enabling, by the processing unit the moveable monitoring device to move to a region having a higher priority earlier than to a region having a lower priority; and
  instructing, by the center controller, the moveable monitoring device to monitor the one or more electronic devices in the plurality of regions based on determined monitoring orders for the plurality of regions, wherein the moveable monitoring device detects device-level environmental conditions of same or different types electronic devices from the region-level environmental conditions detected.

17. The system of claim 16, wherein determining the region priorities further comprises:
determining the region priorities further based on at least one of the following:

a historical movement path of the moveable monitoring device through the plurality of regions, occurrence frequencies of risk events in the plurality of regions, and historical region priorities of the plurality of regions.

18. The system of claim 16, wherein the acts further comprise: for a given region of the plurality of regions having a plurality of electronic devices located therein, determining respective device priorities of the plurality of electronic devices, a device priority indicating a probability of occurrence of a risk event with respect to a corresponding electronic device; and determining, based on the device priorities, a monitoring order of the plurality of electronic devices for monitoring of the moveable monitoring device, wherein the determining of the movement path is further based on the device priorities.

19. The system of claim 18, wherein determining the device priorities comprises:

determining the device priorities based on at least one of the following:

occurrence frequencies of risk events with respect to the plurality of electronic devices, historical device priorities of the plurality of electronic devices, a historical monitoring order of the plurality of electronic devices, and a current device-level environmental condition associated with at least one of the plurality of electronic devices that is detected by the moveable monitoring device.

20. The system of claim 16, wherein at least one of the region-level environmental conditions and the device-level environmental conditions indicates at least one of the following: ambient parameters of a physical environment and operational status of the electronic devices.

* * * * *